United States Patent [19]

McCracken

[11] Patent Number: 4,606,560

[45] Date of Patent: Aug. 19, 1986

[54] THRUST BEARING ROTARY JOINT

[75] Inventor: Donald G. McCracken, Horton, Mich.

[73] Assignee: Aeroquip Corporation, Jackson, Mich.

[21] Appl. No.: 812,819

[22] Filed: Dec. 23, 1985

[51] Int. Cl.[4] ............................................. F16L 39/04
[52] U.S. Cl. ..................................... 285/93; 285/134; 285/190; 285/279
[58] Field of Search ............... 285/134, 135, 190, 93, 285/279, 267, 268, 269

[56] References Cited

U.S. PATENT DOCUMENTS

| | | | |
|---|---|---|---|
| 1,934,717 | 11/1933 | Johnson | 285/135 |
| 2,791,449 | 5/1957 | Monroe | 285/268 X |
| 3,265,411 | 8/1966 | Monroe et al. | 285/135 |
| 4,194,767 | 3/1980 | McCracken | 285/134 |
| 4,254,972 | 3/1981 | Wiedenbeck et al. | 285/134 X |
| 4,477,107 | 10/1984 | Ferguson et al. | 285/134 |

Primary Examiner—Thomas F. Callaghan
Attorney, Agent, or Firm—Phillip S. Oberlin

[57] ABSTRACT

An improved rotary joint structure for transmitting fluid into and removing condensate from a rotating device, including a stationary housing into which a rotatable sleeve extends. A siphon pipe is positioned concentrically within the rotatable sleeve. At the free end of the rotatable sleeve there is positioned a fixed combination seal and thrust bearing which carries the thrust load of the sleeve. A spherical surface on the fixed bearing engages a corresponding surface on a sleeve flange affixed to the rotatable sleeve to maintain the sleeve in position as it rotates. A second seal unit is provided on the sleeve at the opposite end of the housing, and a compression spring encircles the rotatable sleeve between the two seal units to urge them into engagement with their respective sealing surface. Both the combination seal and thrust bearing unit and the second seal unit can be replaced without removing and disassembling the joint.

17 Claims, 3 Drawing Figures

THRUST BEARING ROTARY JOINT

BACKGROUND OF THE INVENTION

1. Field of the Invention

This invention pertains generally to a rotary joint for connecting a stationary fluid supply line to a rotating device, and more particularly to an improved thrust bearing rotary joint of the aforementioned type incorporating a rotating siphon pipe.

2. Description of the Prior Art

Rotary joints are conventionally employed for connecting stationary fluid supply or withdrawal lines to rotary devices such as the steam heated drying drums employed in the paper industry. In such applications the joints are subjected to stresses induced by vibration, misalignment, and temperature fluctuations. Consequently, joints employed heretofore have frequently failed after relatively brief intervals of service so as to necessitate their repair or replacement. An improved joint having an extended service life is disclosed in U.S. Pat. No. 4,194,767. However, the seals in all such joints eventually deteriorate so that they must be replaced. Due to the nature of their construction it was generally necessary to remove and completely disassemble the prior art joints in order to replace their seals, thereby resulting in excessive down time for the equipment.

SUMMARY OF THE INVENTION

In accordance with the present invention there is provided an improved rotary joint structure which has an extended service life and wherein the seals can be replaced when necessary without removing and completely disassembling the joint. The joint structure includes a housing into which a rotatable sleeve extends. At its free or distal end the rotatable sleeve is provided with a combination seal and thrust bearing which carries the full thrust load of the sleeve, while a second seal provided on the sleeve at the opposite end of the housing is free of thrust load so as to exhibit much less wear than the combination seal and thrust bearing. The combination seal and thrust bearing can be quickly and easily replaced when necessary by simply removing an end cap from the housing. The second seal can likewise be replaced through the open end of the housing upon removal of the end cap, as will be less frequently necessary, without removing the housing or sleeve from the rotary device.

It is, therefore, a primary object of the invention to provide an improved rotary joint structure which is durable and easy to maintain.

Another object of the invention is to provide such a joint structure in which a combination seal and thrust bearing is subject to a majority of the wear, and the seal and thrust bearing can be quickly and easily replaced.

Another object is to provide such a joint structure in which the seals can be replaced without removing the housing and/or sleeve from the rotary device with which it is employed.

Another object is to provide such a rotary joint structure having an inspection port through which the condition of one of the seals can be visually observed.

Still another object is to provide a rotary joint structure including an index on its supports which is indicative of the degree of wear of the seals therein.

Yet another object is to provide such a rotary joint structure in which any leakage at the combination seal and thrust bearing is within the flow area and across parts so there is no external leakage from the joint structure.

Other objects and advantages will become more apparent during the course of the following description, when taken in connection with the accompanying drawings.

BRIEF DESCRIPTION OF THE DRAWINGS

In the drawings, wherein like numerals refer to like parts throughtout.

DESCRIPTION OF THE PREFERRED EMBODIMENT

Figure 1:
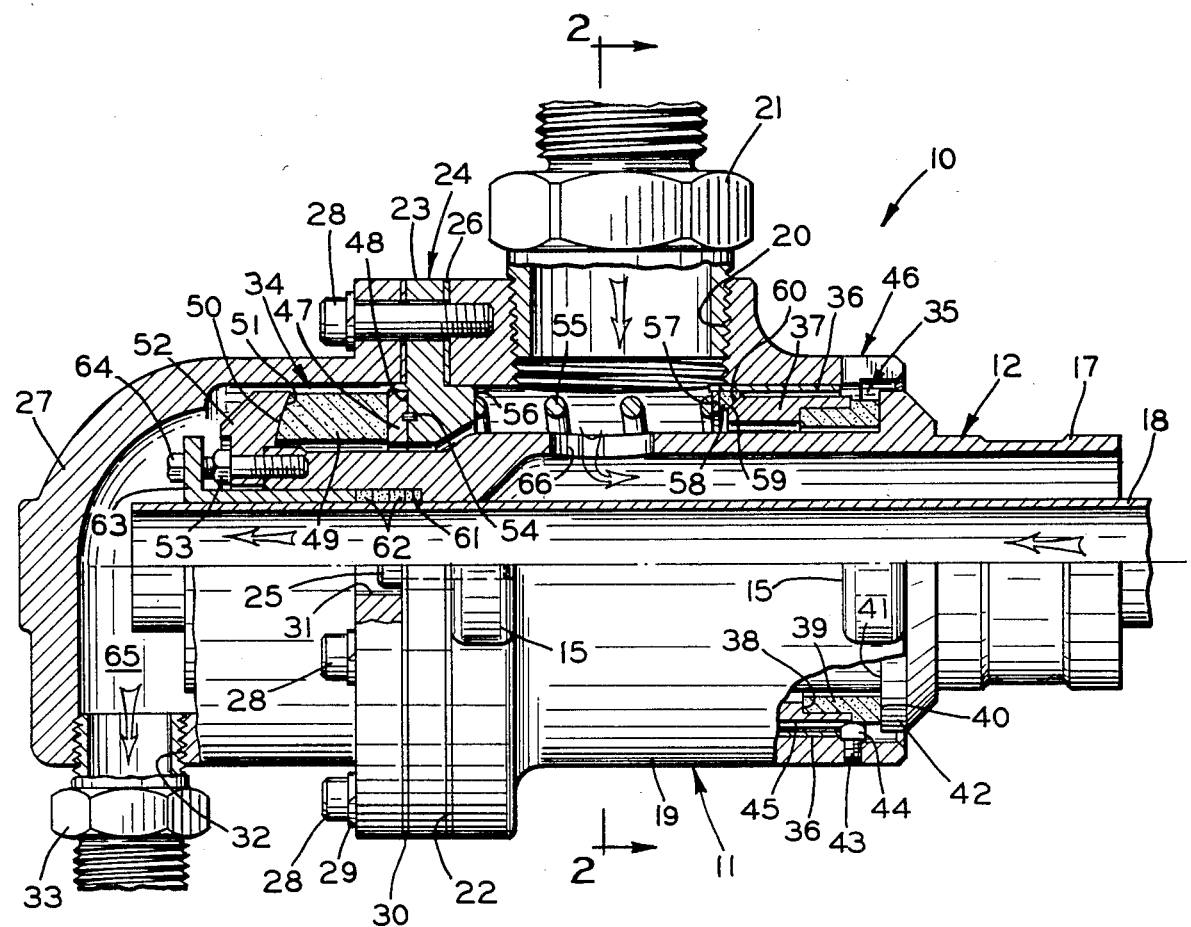
FIG. 1 is a side elevational view, partially in section, of a rotary joint constructed in accordance with the invention.
Figure 3:
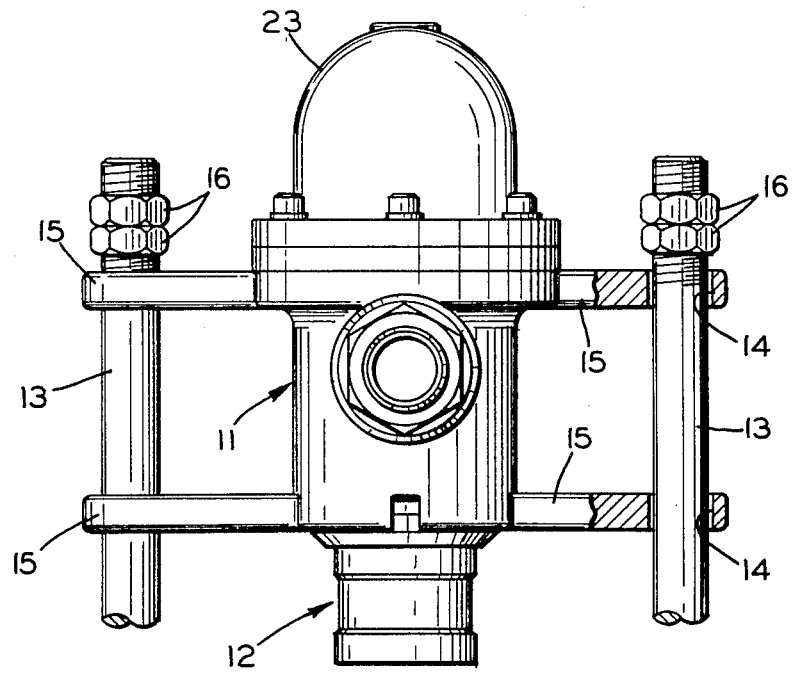
FIG. 3 is a fragmentary plan view, partially in section, of the joint structure and support rods therefore.

Referring now to the drawings, and in particular to FIG. 1, there is illustrated in its entirety at 10 a rotary joint structure which embodies the present invention. The rotary joint 10 includes a centrally disposed stationary housing 11 encasing a rotatable sleeve 12 adapted to be suitably coupled in a conventional manner to a hollow journal (not shown) extending from a rotary device such as the steam heated drum of a paper drier (also not shown). The rotary joint may be supported as by support rods 13 carried by the framework (not shown) of the associated rotary device and extending through openings 14 in pairs of spaced ears 15 depending from the stationary housing 11. The openings are of sufficient diameter to permit the ears to move freely axially along the rods. Threaded lock nuts 16 on the support rods are preset during installation with a known spacing between the inner faces of the lock nuts and the adjacent faces of the ears 15 (FIG. 3) for a purpose to be hereinafter described. The rotatable sleeve 12 may advantageously be provided with a conventional coupler arrangement 17 adapted to mate with a corresponding coupler (not shown) on the rotary device by means of a conventional split collar (likewise not shown) for facilitating coupling and uncoupling of the rotary joint structure. A concentric rotary siphon pipe 18 also extends axially into the rotatable sleeve 12 for removing condensate from the interior of the rotary device.

The stationary housing 11, as will be apparent in FIG. 1, comprises a central tubular section 19 having opposed open ends and a threaded inlet port 20 for receiving the threaded end of a nipple 21 connected to a stationary fluid supply line (not shown). At one of its open ends the tubular section is provided with a planar face 22 against which a flange 23 of a seat member 24 abuts. The seat member, for a purpose to be hereinafter more fully described, is secured by studs 25, one of which is shown, threaded into the stationary housing 11. A gasket 26 is provided between the planar face and the flange to create a fluid impervious joint therebetween. An end cap 27 is secured against the seat member 24 by means of a plurality of cap screws 28 extending through the flange 23 and threaded into the stationary housing. The cap screws are provided with lock washers 29 to insure against their becoming loosened due to vibration of the joint structure, and a gasket 30 is provided at the interface between the end cap and seat member.

In order to facilitate replacement of the aforementioned combination seal and thrust bearing assembly as will be hereinafter explained, the cap screws 28 extend freely through the flange 23 of the seat member 24 and are threaded only into the stationary housing 11. Thus, the cap screws 28 urge the end cap 27, seat member 24 and planar face 22 into sealing relationship with their respective gaskets 26 and 30. By removing the cap screws, the end cap 27 can be removed to gain access to the combination seal and thrust bearing while the studs 25, whose heads are recessed within enlarged openings 31 in the end cap, retain the seat member 24 in assembled position on the stationary housing 11. The end cap 27 further includes a threaded outlet port 32 receiving the mating threaded end of a nipple 33 for connection to a stationary drain line (not shown) through which fluid condensate is removed from the joint structure.

The sleeve 12 and siphon pipe 18, which rotate as a unit, are journalled within the stationary housing 11 by a combination seal and thrust bearing assembly 34 at the rear and by a replaceable seal unit 35 at the forward end of the housing. More particularly, there is provided within the tubular section 19 at the forward end a ring insert 36 within which the seal unit 35 is concentrically received. The seal unit itself comprises a cylindrical band 37 having a counterbore 38 within which is affixed a sealing ring 39, preferably of a durable carbon material. The sealing ring 39 has an end wall 40 which is urged into sealing engagement with an abutment wall 41 of a flange 42 formed on the sleeve 12 as will be hereinafter explained.

Figure 2:
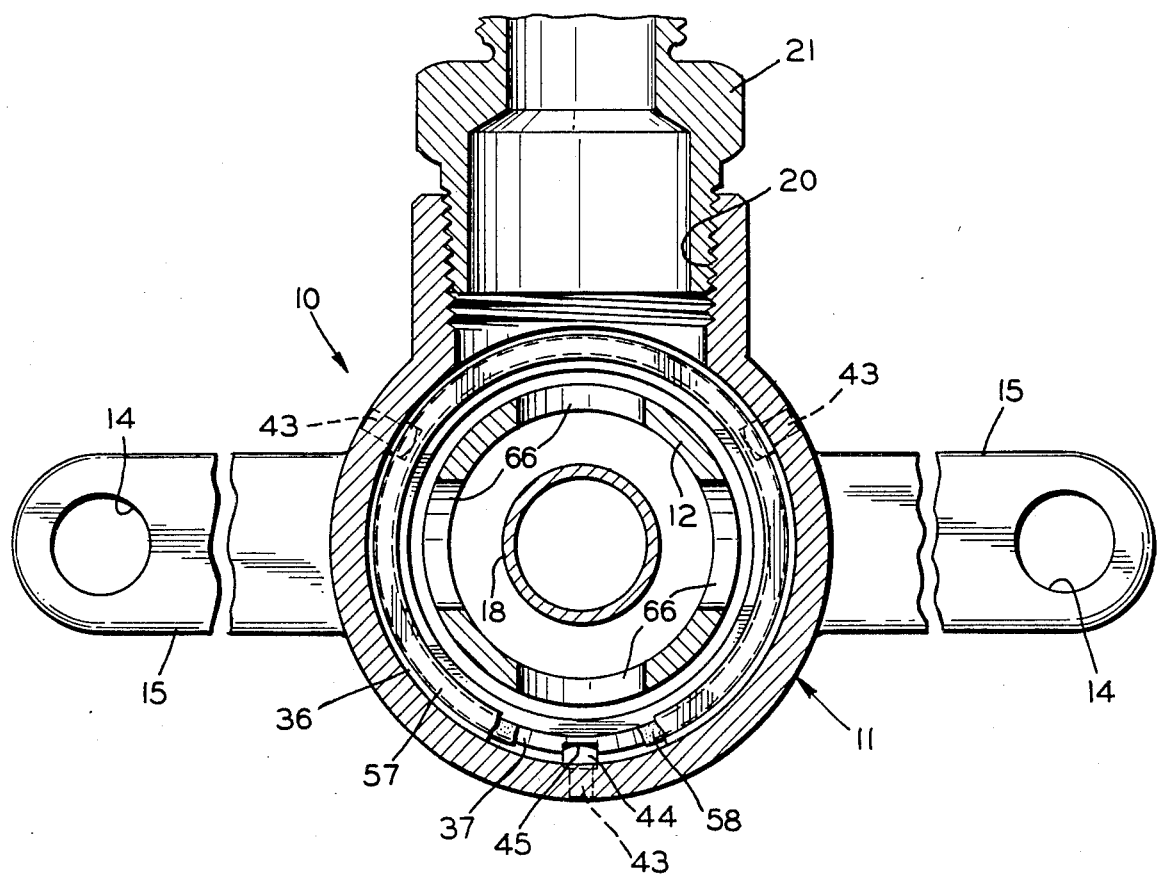
FIG. 2 is a transverse sectional view taken substantially along line 2—2 of FIG. 1.

The seal unit 35 surrounds the sleeve 12 and is provided with means preventing it from rotating with the sleeve, that is, holding it stationary within the ring insert 36, while permitting limited axial movement to compensate for wear of the sealing ring 39 during use and ensure that the end wall 40 of the sealing ring will remain in sealing engagement with the abutment wall 41. To that end, as best shown in FIG. 2 there is provided a plurality, in this case three, set screws 43 threaded into openings in the stationary housing 11 and generally equally spaced radially therearound. The setscrews are inserted from the interior of the central tubular section 19 so that their heads 44 are adjacent the inner surface of the tubular section. A corresponding elongated slot or recess 45 is provided in the cylindrical band 37 for receiving each of the heads 44. The heads thus engage the sidewalls of the slots or recesses and prevent the cylindrical band from turning with the rotatable sleeve 12. At the same time the heads are able to slide longitudinally within the slots so as to permit the seal unit 35 to move axially along the stationary housing 11 and rotatable sleeve 12. There is also provided at the end of the tubular section 19 adjacent the sealing ring 39 a small cut out or inspection port 46 through which the end portion of the sealing ring can be visually observed to determine the conditon of the ring and ascertain when it needs to be replaced.

The combination seal and thrust bearing assembly 34 at the rear of the joint includes a thrust bearing collar disposed between the seat member 24 and a sleeve flange at the end of the rotatable sleeve 12, and preferably comprises a bearing seat 47 seated within a counterbore 48 in the seat member 24. Affixed to the bearing seat is a thrust bearing collar 49 of a suitable bearing and seal material, preferably one of the carbon materials commonly employed for such purposes. The bearing collar is provided on its end face with a spherical surface 50 adapted to engage a mating, oppositely disposed spherical surface 51 of a sleeve flange 52 affixed to the end of the rotatable sleeve 12 by studs 53 threaded thereinto. In order to insure that the seal and thrust bearing assembly 34 does not rotate with the sleeve 12, the bearing seat 47 is provided with a roll pin 54 which projects into an opening in the seat member 24 to interlock the members.

The seal and thrust bearing assembly 34 and seal unit 35 are urged axially apart so that the seals engage their respective sealing surfaces by a compression spring 55 encircling the rotatable sleeve 12 within the central tubular section 19 as illustrated in FIG. 1. The compression spring is seated at one end against a ledge 56 on the seat member 24, while at the opposite end it seats against a retainer washer 57 encircling the sleeve 12 and adapted to be slideably received within the ring insert 36. The retainer washer 57, in turn, bears against a sealing element which may be in the form of a conventional O-ring or preferably, as illustrated in FIG. 1, a wedge seal washer 58 of a material suitable for the high temperature environment such as Teflon. The wedge seal 58 fits within the ring insert 36 and includes a bevelled edge 59 abutting a mating bevelled face 60 on the cylindrical band 37 so that, upon being urged against the bevelled face by the spring 55 and retainer washer 57, the wedge seal 58 will be urged into sealing engagement with both the ring insert 36 and the bevelled face 60.

As hereinabove mentioned the rotary siphon pipe 18 extends axially within the rotatable sleeve 12 removing condensate from the interior of the associated rotary device. Thus, the rotatable sleeve 12 is provided with a concentric bore 61 for receiving the free end of the siphon pipe. Annular packing rings 62 disposed within the bore 61 are compressed against the end of the bore by a cylindrical packing plug 63 to securely support and seal the free end of the siphon pipe within the rotatable sleeve. The packing plug is urged into compressive engagement with the packing rings 62 by means of a plurality of fasteners 64 spaced therearound and tapped into the sleeve flange 52. The siphon pipe 18 is thus held in sealed communication with a drainage chamber 65 defined by the end cap 27 and the sleeve flange 52.

In operation heated fluid under pressure, generally steam, is supplied to the inlet port 20 so as to follow the path indicated by the arrows in FIG. 1 through access ports 66 in the rotatable sleeve 12, into the annular chamber defined between the interior of the sleeve and the exterior of the siphon pipe 18. The steam then flows along the annular chamber into the rotary device as for heating the interior surface of the rotating drum. Condensate forming within the drum interior is collected and admitted to the interior of the rotary siphon pipe 18 whereupon it flows, as indicated by the arrows in FIG. 1, into the drainage chamber 65 for discharge through the outlet port 32. The drainage chamber is, of course, in communication with the seal and thrust bearing assembly 34 so that the fluid condensate may serve as a lubricant for the thrust bearing collar 49 to thus extend its service life.

As will be apparent in FIG. 1 the spring 55, acting between the ledge 56 and the retainer washer 57, urges the replaceable seal unit 35 and end wall 39 thereof against the abutment wall 41. The rotatable sleeve 12 is, in turn, urged to the right as viewed in FIG. 1 so as to press the spherical surface 51 on the sleeve flange 52 against the spherical surface 50 on the thrust bearing collar 49. Due to the configuration of the sleeve flange 52 and seal and thrust bearing assembly 34, the rotatable sleeve 12 remains centered within the stationary housing 11 as it rotates, with the thrust bearing collar 49 carrying the thrust load of the joint. As pointed out above, the seal and thrust bearing assembly 34 absorbs a major portion of the wear in the joint and, when necessary, the assembly can be quickly and simply replaced by removing the end cap 27 and sleeve flange 52 along with the packing plug 63, without further disassembly of the joint.

The condition of the sealing ring 39 at the other end of the rotary joint can be visually observed through the inspection port 46. Since the thrust bearing collar 49 carries the thrust load on the joint, the sealing ring 39 will generally outlast several of the thrust bearing collars. The amount of seal remaining at any given time, that is, the amount of seal, or distance, between the end of the band 37 and the abutment wall 41 of the flange 42, can be determined by visual observation through the inspection port. That distance may, for example, be on the order of 0.38 inch (9.65 mm) for a new seal and when the distance decreases to about 0.12 inch (3.04 mm), replacement of the seal unit 35 is indicated. Such replacement is preferably accomplished while the seal and thrust bearing assembly 34 is being replaced, by additionally removing the seat member 24 so that the compression spring 55, retainer washer 57 and wedge seal washer 58 can be removed over the end of the rotary sleeve 12 to gain access to the seal unit 35. The worn seal unit can then be removed and replaced by a new unit, all in a very short time without removing the rotary joint from the associated rotary device.

In that regard, it will be understood that the rotatable sleeve 12 is axially fixed relative to the associated rotary device through the coupler arrangement 17 and split collar coupler. The support rods 13 are likewise fixed axially relative to the rotary device while as hereinabove described the stationary housing 11, through the openings 14 in the ears 15, is free to move axially along the support rods. Thus, as the seals wear the stationary housing will move along the support rods 13 toward the lock nuts 16. Since the lock nuts are initially set at a known distance from the adjacent ears 15, observation of this distance at any given time will indicate the total amount of seal wear at that time. The condition of the sealing ring 39 can be directly observed through the inspection port 46, and thus the degree of wear of the seal and thrust bearing assembly 34 can be readily determined.

It is to be understood that the form of the invention herewith shown and described is to be taken as an illustrative embodiment only of the same, and that various changes in the shape, size and arrangement of the parts may be resorted to without departing from the spirit of the invention.

I claim:

1. A rotary joint structure for transmitting fluid to and removing fluid from a rotating device comprising, in combination, a stationary tubular housing open at its ends, a rotatable sleeve extending concentrically into said tubular housing from one end, a replaceable seal unit encircling said rotatable sleeve at said one end of said tubular housing, means on said rotatable sleeve against which said seal unit abuts, a seat member encircling said rotatable sleeve and affixed to said tubular housing at its other end, a sleeve flange removably affixed to said rotatable sleeve outside of said seat member, a combination seal and thrust bearing encircling said rotatable sleeve between said seat member and said sleeve flange, and means between said seat member and said replaceable seal unit urging said sleeve flange and said replaceable seal unit axially apart to thereby urge said combination seal and thrust bearing into sealing engagement with said sleeve flange and said replaceable seal unit into sealing engagement with said means against which said seal unit abuts.

2. A rotary joint structure as claimed in claim 1, including a spherical bearing surface on said sleeve flange and a mating spherical surface on said combination seal and thrust bearing for engaging said spherical surface on said sleeve flange to sealingly journal said rotatable sleeve within said tubular housing.

3. A rotary joint structure as claimed in claim 2, wherein said combination seal and thrust bearing includes a bearing seat received within a counterbore in said seat member, means securing said bearing seat against rotation relative to said seat member, and a bearing collar affixed to said bearing seat on which said spherical surface is formed.

4. A rotary joint structure as claimed in claim 1, including an end cap removably affixed to said seat member enclosing the end of said tubular housing and providing access for removing and replacing said combination seal and thrust bearing.

5. A rotary joint structure as claimed in claim 1, including a rotary siphon pipe extending axially within said rotatable sleeve and means sealingly clamping said siphon pipe within said sleeve for rotation therewith.

6. A rotary joint structure as claimed in claim 1, wherein said replaceable seal unit includes a cylindrical band and a sealing ring affixed within a counterbore in said cylindrical band and projecting outwardly therefrom for sealingly engaging said means on said rotatable sleeve against which said replaceable seal unit abuts.

7. A rotary joint structure as claimed in claim 6, including an inspection port in said stationary housing through which said sealing ring can be visually observed for determining its condition.

8. A rotary joint structure as claimed in claim 1, wherein said means between said seat member and said replaceable seal unit comprises a compression spring encircling said rotatable sleeve and bearing at one end against said seat member and at the other end against means engaging said replaceable seal unit.

9. A rotary joint structure as claimed in claim 8, including a ring insert within said stationary tubular housing encircling said replaceable seal unit, said means engaging said replaceable seal unit comprising a retainer washer encircling said rotatable sleeve within said ring insert and abutting said compression spring, and a seal washer encircling said rotatable sleeve within said ring insert between said retainer washer and said replaceable seal unit.

10. A rotary joint structure as claimed in claim 9, including a bevelled surface on said seal washer and a mating bevelled face on said replaceable seal unit whereby said compression spring urges said seal washer into sealing engagement with said ring insert and said bevelled face on said replaceable seal unit.

11. A rotary joint structure as claimed in claim 3, in which said replaceable seal unit includes a cylindrical band and a sealing ring affixed within a counterbore in said cylindrical band and projecting outwardly therefrom for sealingly engaging said means on said rotatable sleeve against which said replaceable seal unit abuts.

12. A rotary joint structure as claimed in claim 1, including anti-rotation means adapted to prevent said replaceable seal unit from rotating with said rotatable sleeve while permitting limited axial movement relative thereto.

13. A rotary joint structure as claimed in claim 12, wherein said replaceable seal unit includes a cylindrical band and a sealing ring affixed within a counterbore in said cylindrical band and projecting outwardly therefrom for sealingly engaging said means on said rotatable sleeve against which said replaceable seal unit abuts, said anti-rotation means comprising at least one elongated slot in the outer surface of said cylindrical band and extending transversely thereof, and means projecting from the inner surface of said stationary tubular housing slidingly received in said elongated slot.

14. A rotary joint structure as claimed in claim 13, including a plurality of said elongated slots equidistantly spaced radially around said cylindrical band, said means projecting from the inner surface of said tubular housing comprising the heads of set screws extending into said tubular housing.

15. A rotary joint structure as claimed in claim 1, including indicating means for determining the total degree of wear of said sealing ring and said combination seal and thrust bearing.

16. A rotary joint structure as claimed in claim 15, wherein said tubular housing is axially moveable relative to said rotatable sleeve, said indicating means including a rod spaced from said tubular housing and in axial alignment therewith, said rod axially fixed relative to said rotatable sleeve, at least one ear extending outwardly of said tubular housing and including an opening for receiving said rod, the opening being of sufficient size to permit said ear to move freely along said rod, and indexing means disposed at a predetermined position on said rod for determining relative movement between said ear and said rod.

17. A rotary joint structure as claimed in claim 16, wherein said indexing means includes a nut member and said rod includes an externally threaded portion for receiving said nut member.

* * * * *